United States Patent [19]
McNabney

[11] 3,961,748
[45] June 8, 1976

[54] AIR DISTRIBUTION REGULATOR APPARATUS

[75] Inventor: John C. McNabney, La Crosse, Wis.

[73] Assignee: The Trane Company, La Crosse, Wis.

[22] Filed: June 30, 1975

[21] Appl. No.: 591,742

Related U.S. Application Data

[62] Division of Ser. No. 498,826, Aug. 19, 1974.

[52] U.S. Cl...................................... 236/49; 236/87; 236/80 R; 165/26; 98/40 D; 137/625.38
[51] Int. Cl.²............................................. F24F 7/00
[58] Field of Search............ 236/49, 87, 80 B, 80 R, 236/1 B; 165/26; 137/625.37, 625.38; 98/40 D, 41 AV, 40 R

[56] References Cited
UNITED STATES PATENTS

| | | |
|---|---|---|
| 3,434,409 | 3/1969 | Fragnito................................ 236/49 |
| 3,631,891 | 1/1972 | Brumm............................ 137/625.38 |
| 3,687,364 | 8/1972 | McNabney............................. 236/49 |
| 3,719,321 | 3/1973 | McNabney............................. 236/49 |
| 3,743,180 | 7/1973 | Perkins et al......................... 236/49 |
| 3,809,314 | 5/1974 | Engelke et al........................ 236/49 |

*Primary Examiner*—William E. Wayner
*Assistant Examiner*—Henry C. Yuen

[57] ABSTRACT

Three embodiments of an air distributor apparatus are shown which utilizes a balanced type air flow control valve of cylindrical configuration co-operatively associated with a cylindrical sleeve having circumferentially spaced openings closed by the valve. A diaphragm powered valve actuator is disposed within the sleeve which is installed at the air inlet of an air distributor plenum. Several control schemes are disclosed.

13 Claims, 7 Drawing Figures

AIR DISTRIBUTION REGULATOR APPARATUS

This is a division, of application Ser. No. 498,826 filed Aug. 19, 1974.

This invention relates to air distribution apparatus and particularly apparatus used to control air for temperature control and ventilation in buildings.

This invention relates to an air distributor apparatus which provides an air flow control sub-assembly which may be simply, easily, and quickly installed at the inlet opening of an air diffuser plenum chamber. The air controlling valve is of the balanced flow type thereby enabling it to be powered with minimum energy such as might be derived from the distributed air alone. Owing to the compact relation of the elements, the air flow control assembly may be installed at the diffuser assembly inlet and removed and displaced by a like or different air control assembly without removal of the diffuser assembly. The air control assembly is retained within the air inlet opening of the distributor diffuser plenum chamber by a simple detent which may be overcome by sufficient force for purposes of removal of the air flow control assembly.

These and other aspects of the invention will become more apparent as this disclosure describes my invention with references to the drawings in which.

The first embodiment of my invention will be described with reference to FIGS. 1-4 of the drawings. Illustrated within these figures is a high velocity air distribution system for distributing air at relatively high pressure such as between about 0.5 and 6.0 inches of water (125 to 1490 pascals) to a room for the purpose of ventilation and temperature control.

Figure 1:
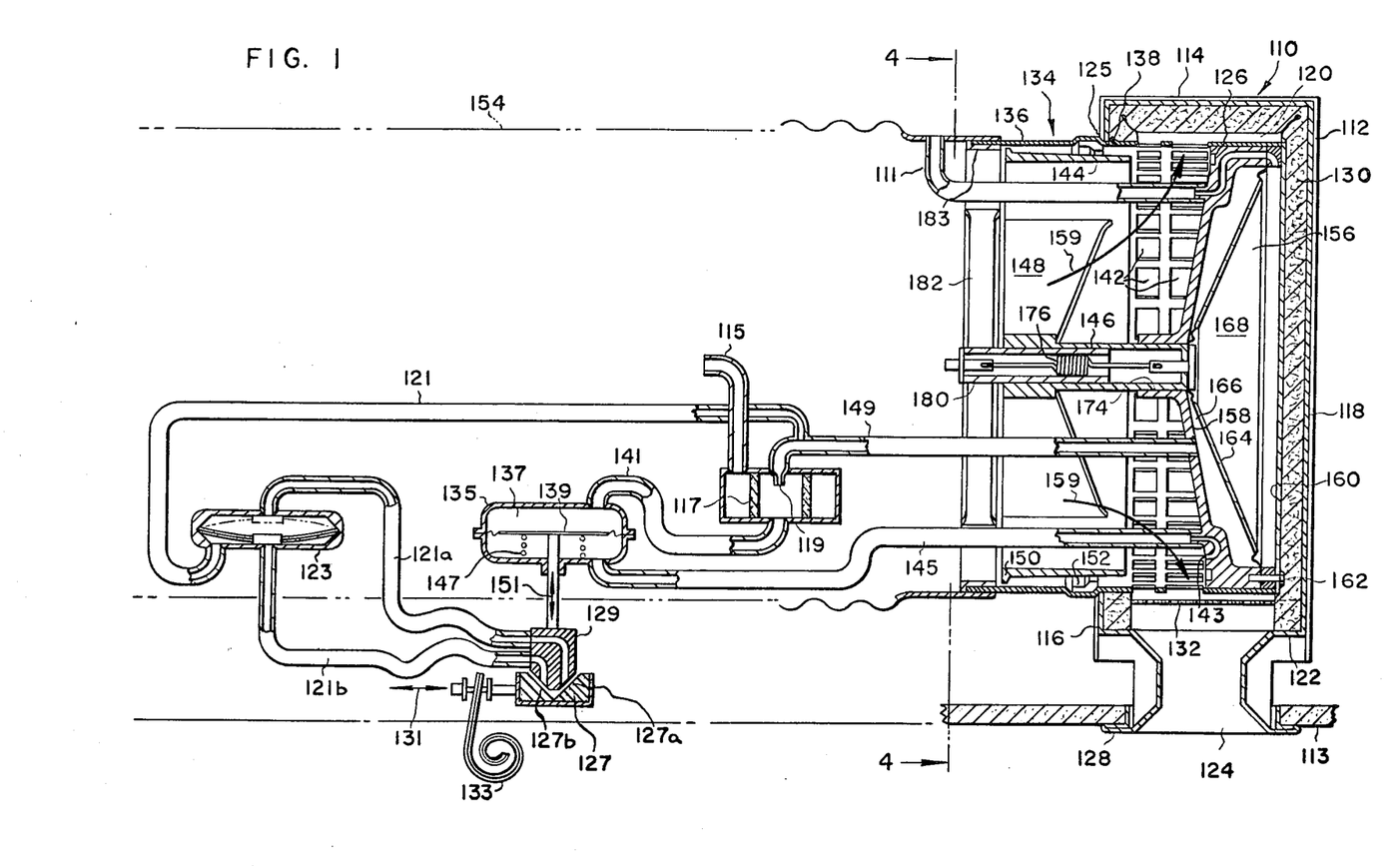
FIG. 1 is a partially sectioned partial schematic of a first embodiment of my invention particularly adapted to variable volume high velocity applications where temperature control is needed.

Specifically there is provided an air diffuser assembly 110 which has an air diffuser plenum chamber 112. Chamber 112 is preferably rectangular in configuration and includes a top wall 114, a front wall 116, a back wall 118, spaced from said front wall by the thickness of said plenum chamber, a pair of end walls 120 spaced from each other by the width of said plenum chamber, and a bottom wall 122 spaced from the top wall by the depth of said plenum chamber.

The bottom wall 122 is provided with an elongated diffuser outlet 124 extending substantially entirely across the width of the diffuser assembly for discharging air from the plenum chamber 112 into a room or conditioned space served by the air diffuser assembly such as through a false ceiling as designated by numeral 113. The front wall has a circular air inlet aperture or opening 125 therethrogh for receiving an air flow control assembly 134.

The bottom 122, front 116, top 114, and back 118 walls are preferably constructed of a single piece of sheet metal, the ends of which may be shaped as shown to provide flanges 128 for supporting ceiling tile when the diffuser assembly is mounted flush with the room ceiling 113. The diffuser assembly may be mounted in any known manner such as suspending it from above or by coating the lower edges of the end walls directly on the flanges of T bars (not shown) of a false ceiling. The plenum chamber 112 is preferably lined with a fiberglass material 130 which has both thermal and acoustical insulating properties. A crescent shaped perforated baffle 132 extending below the inlet opening 125 between the front and back walls may be provided to further reduce noise and enhance air distribution.

The flow of air at the diffuser assembly is controlled by air flow control assembly 134. The air flow control assembly has a cylindrical sleeve 136 having an inner portion of which extends inwardly beyond the inlet aperture 125 of the plenum chamber 112 and an outer portion of which extends outwardly beyond inlet aperture 125. A detent 138 in the form of a raised portion of sleeve 136 is provided on the outer surface of the sleeve 136 to retain the sleeve 136 in the position shown on aperture 125 of FIG. 1. However, it is understood that by applying sufficient manual force, sleeve 136 and the associated air flow control assembly may be removed and replaced.

Figures 2, 3, 6:
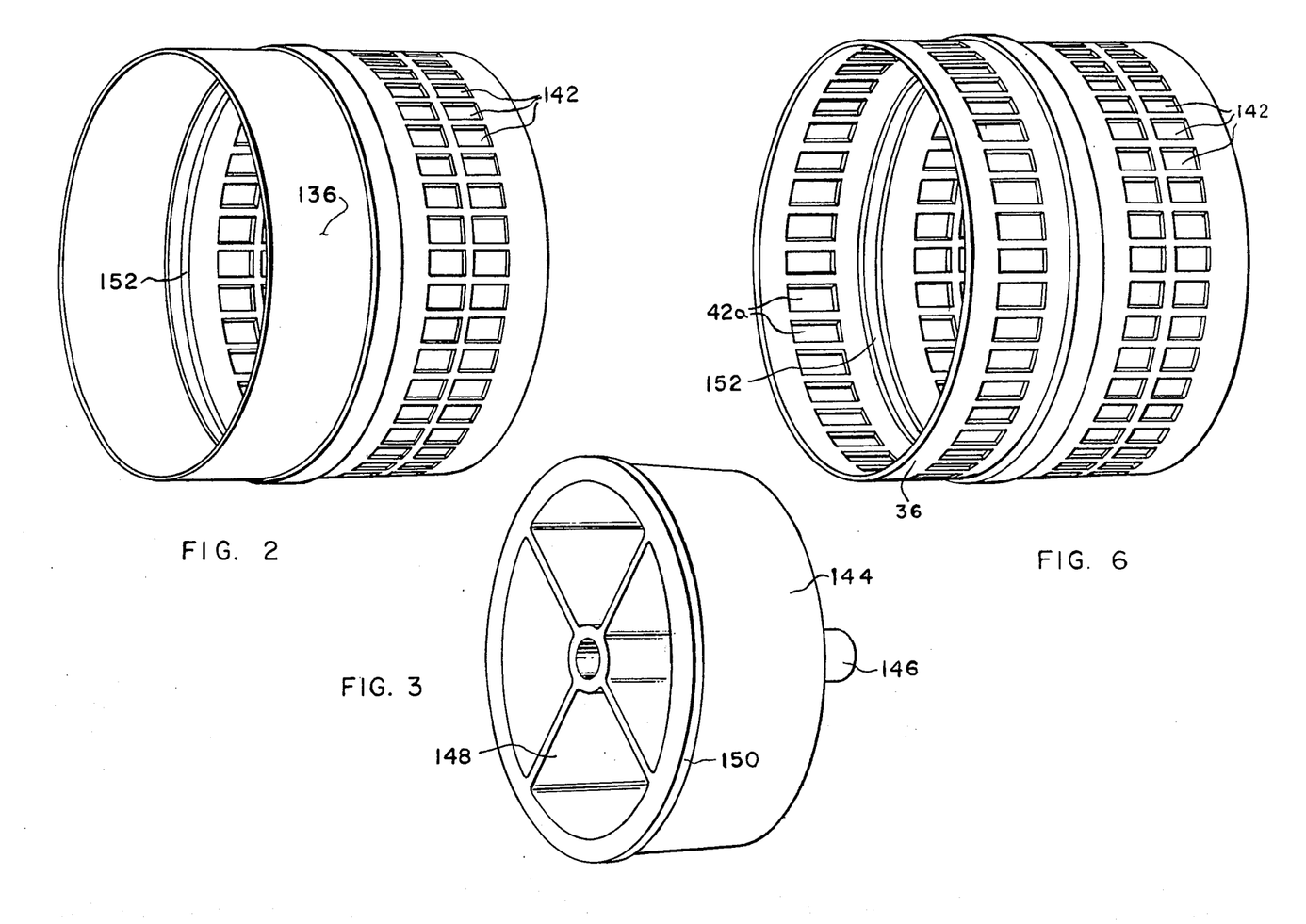
FIG. 2 is a perspective of a cylindrical sleeve that forms the main housing and flow orifice for the air flow control assembly shown in FIG. 1.
FIG. 3 is a perspective of a cylindrical valve employed in all embodiments of the invention to control the flow through the apertures or orifice openings of the sleeve.
FIG. 6 is a perspective of the cylindrical sleeve that forms the main housing and flow orifices for the air flow control assembly of the apparatus shown in FIG. 5.
Figure 4:
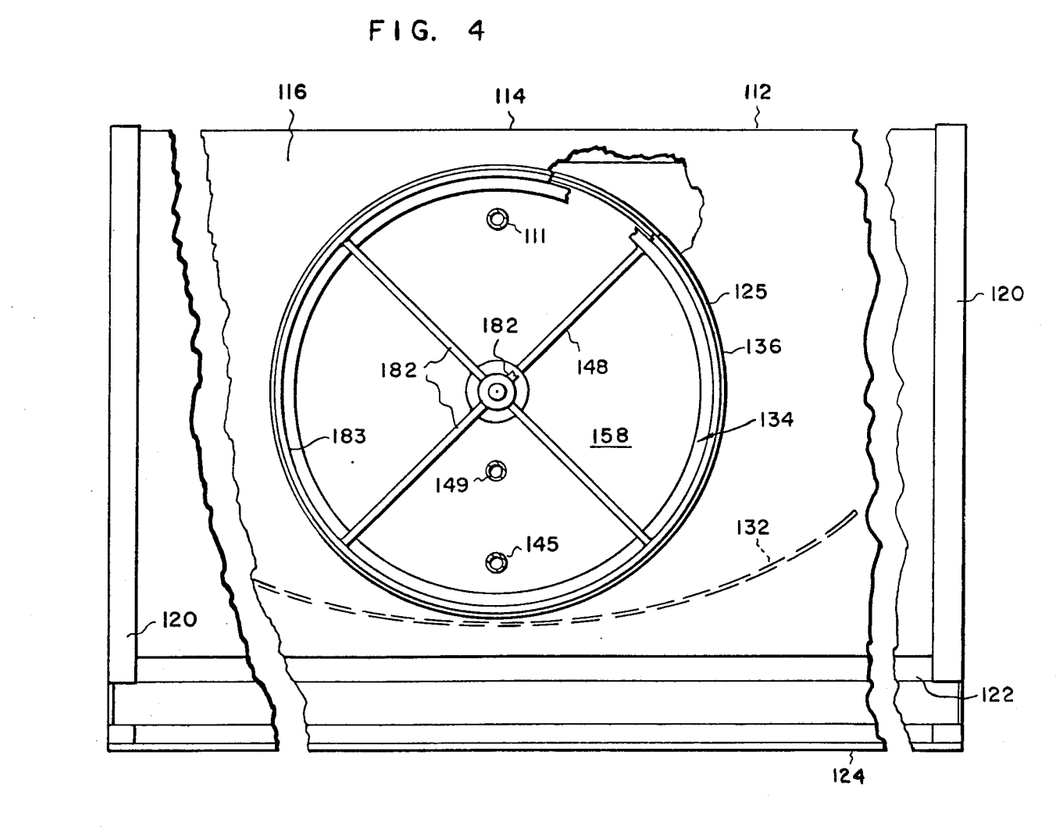
FIG. 4 is a view of the air distributor apparatus of FIG. 1 taken along a line 4—4 of FIG. 1.

Sleeve 136 is provided with a row of circumferentially spaced first apertures 142 disposed internally of the plenum chamber 112. Apertures 142 may be formed as shown as two adjacent rows of apertures so as not to unduly weaken the sleeve 136 by large apertures. With some additional noise the plural apertures might be substituted by a single large aperture or opening in which case the wall 158 hereinafter described would be supported from said sleeve by an axially extending member.

A cylindrically shaped valve 144 is carried by a tubular portion 146 connected thereto by a plurality of weblike spokes 148. Portions 144, 146, 148 may be fabricated or formed as a single integral piece. Details for supporting the cylindrical valve 144 for axial adjustment will be described hereinafter. The left end (FIG. 1) of the cylindrical valve 144 is provided with a radially extending annular sealing flange 150 which is arranged to sealingly seat against a first annular resilient seal member 152 when cylindrical valve 144 is positioned to the extreme right. Also in this position the right end edge of valve 144 will sealingly abut against a second annular resilient seal 126.

Air is supplied to the diffuser assembly 110 via air conveying duct 154 preferably of the flexible type commonly employed in air distribution systems. Duct 154 is connected to the outer end of sleeve 136 and appropriately clamped in place if desired. The air flowing through duct 154 flows outwardly of sleeve 136 through apertures 142 and is limited by the axial position of valve 144.

It will be appreciated that in many air distribution systems for purposes of ventilation, heating, and cooling, the air pressure at a terminal air diffuser assembly may vary with the air distribution pattern of the system. It is also desirable to control the flow from such a terminal air diffuser assembly in accordance with the demands of heating and cooling as may be dictated by the temperature of the conditioned space served by the air distributor assembly.

To this end I have provided an actuator for valve 144 for automatically adjusting the axial position of cylindrical valve 144 for compensating for pressure variations in the distribution system as well as to provide the desired temperature control for both heating and cooling conditions. For these purposes I have provided a diaphragm chamber 156 disposed at the inner end of sleeve 136 having a diaphragm chamber front wall 158 press fitted within sleeve 136 and a diaphragm chamber back wall 160 connected thereto as by screws 162. Front wall 158 is conical so as to deflect the air passing axially in sleeve 136 in a radially outward direction through apertures 142 as depicted by arrows 159. Conical wall 158 serves as the closure for the end of sleeve 136.

An axially movable circular diaphragm 164 sealingly divides the diaphragm chamber 156 into a front portion 166 and a rear portion 168. The end of tubular portion 146 slidably and sealingly extends through an aperture 174 in front wall 158 and is connected at its rear end to be moved by diaphragm 164. Tube member 180 extends into and supports for axial movement the forward portion of tubular portion 146 of valve 144. Member 180 is positioned by ribs 182 extending radially inwardly from an annulus 183 press fitted within the forward end of sleeve 136. Members 180, 182 and 183 are preferably integrally constructed.

A biasing tension spring 176 is anchored at the forward end of tube member 180. The other end of spring 176 is connected to the rear end of tubular portion 146 to bias diaphragm 164 and valve 144 to the left or valve open position. The valve 144 is moved to the right against the bias of spring 176 by the diaphragm in response to the relative fluid pressures applied to the forward and rear portions 166 and 168 of diaphragm chamber 156.

To this end the pressure in the rear portion 168 of the diaphragm chamber is maintained at atmospheric pressure through a pressure passageway 111. The forward portion 166 of diaphragm chamber 156 communicates through a pressure passageway 149 which connects to a self-powered pnuematic control system described hereinafter.

The self-powered pneumatic control system has a tube 115 which has an end opening, i.e. face, normal to the air flow of duct 154 to thereby sense total pressure in duct 154. Tube 115 communicates through a filter element 117 with pressure passageway 149 via a restrictor or orifice 119 disposed at downstream side of filter element 117. Thus air passing into tube 115 from duct 154 passes through filter 117, orifice restrictor 119, and pressure passageway 149 to pressurize the forward portion 166 of diaphragm chamber 156 thereby causing valve 144 to move against the bias of spring 176 toward its position closing apertures 142.

However, the pressure within the forward portion 166 is limited by a vent passage 121. Vent passage 121 communicates alternatively with first vent passageway 121a for summer operation and second vent passageway 121b for winter operation by way of snap acting bimetal actuated three way changeover valve 123 which sensor is positioned in heat exchange relation with the air passing in duct 154. Thus when cooling air is supplied through duct 154 such as air below 70° F, the valve 123 assumes the position shown in full line communicating passageways 121 and 121a. When heating air is supplied such as air above 80° F valve 123 assumes the position shown in dashed line communicating vent passageways 121 and 121b.

Passageways 121a and 121b pass through a vent port head 129 is arranged to be moved along an axis as indicated by arrow 151 as will hereinafter be described. To accommodate this movement, vent passageways 121a and 121b are made of flexible material such as plastic tubing. It will also be noted that thee port for vent passageway 121a is on a face of the vent port head 129 which is about normal to the face on which the port for vent passageway 121b is located. Each of these port faces is oblique to the axial movement designated by arrow 151.

A thermal responsive vent port operator 127 is schematically illustrated to move in directions along an axis designated by arrows 131 in response to a bimetallic actuator element 133 positioned to sense temperature in the room served by the air distributor assembly. Arrows 131 and 151 are approximately normal to each other.

Thus as the temperature of the room cools, bimetallic actuator 133 moves in a direction reducing the distance between closure surface 127a and the port for vent passageway 121a while simultaneously increasing the distance between closure surface 127b and the port for vent passageway 121b. During summer operation this closing of passageway 121a will increase the pressure in diaphragm chamber portion 166 to cause valve 144 to close. In the opposite manner valve 144 will be opened during summer operation when the temperature of the conditioned space rises.

During winter operation when the temperature of the room increases, bimetallic actuator 133 moves in a direction reducing the distance between closure surface 127b and the port for vent passageway 121b while simultaneously increasing distance between closure surface 127a and the port for vent passageway 121a. During winter operation this closing of passageway 121b will increase the pressure in diaphragm chamber portion 166 to cause valve 144 to close. Also in the opposite manner valve 144 will be opened during the winter operation when the temperature of the conditioned space falls.

In order that valve member 144 is adjusted to compensate for variations in duct pressure I have provided a velocity compensator actuator 135 which has a chamber 137 divided into two portions by a second movable diaphragm 139. The total pressure in duct 154 as sensed by passageway 115 is applied to one side of diaphragm 139 via pressure passageway 141. To the other side of the diaphragm 139 is applied a static pressure (total pressure minus velocity pressure) as sensed at opening 143 adjacent outlet aperture 142 via pressure passageway 145. Opening 143, i.e., the face thereof, is parallel to the direction of fluid flow upstream of openings 142. The net fluid force on diaphragm 139 is thus approximately two times the velocity pressure and is exerted against the bias of second biasing spring 147 to move the vent port head 129 relative to the vent port operator 127. It will thus be seen that an increase in velocity at 143 will affect a movement the vent port head 129 toward the vent port operator 127 to further restrict the out flow from passage 121 to thereby increase the pressure on the forward side of diaphragm 164 to effect a further closing of the valve 144. Should there be a reduction in the velocity at 143 the reverse action will take place to open valve 144. The effects of the velocity compensator are the same despite the position of valve 123.

Figure 5:
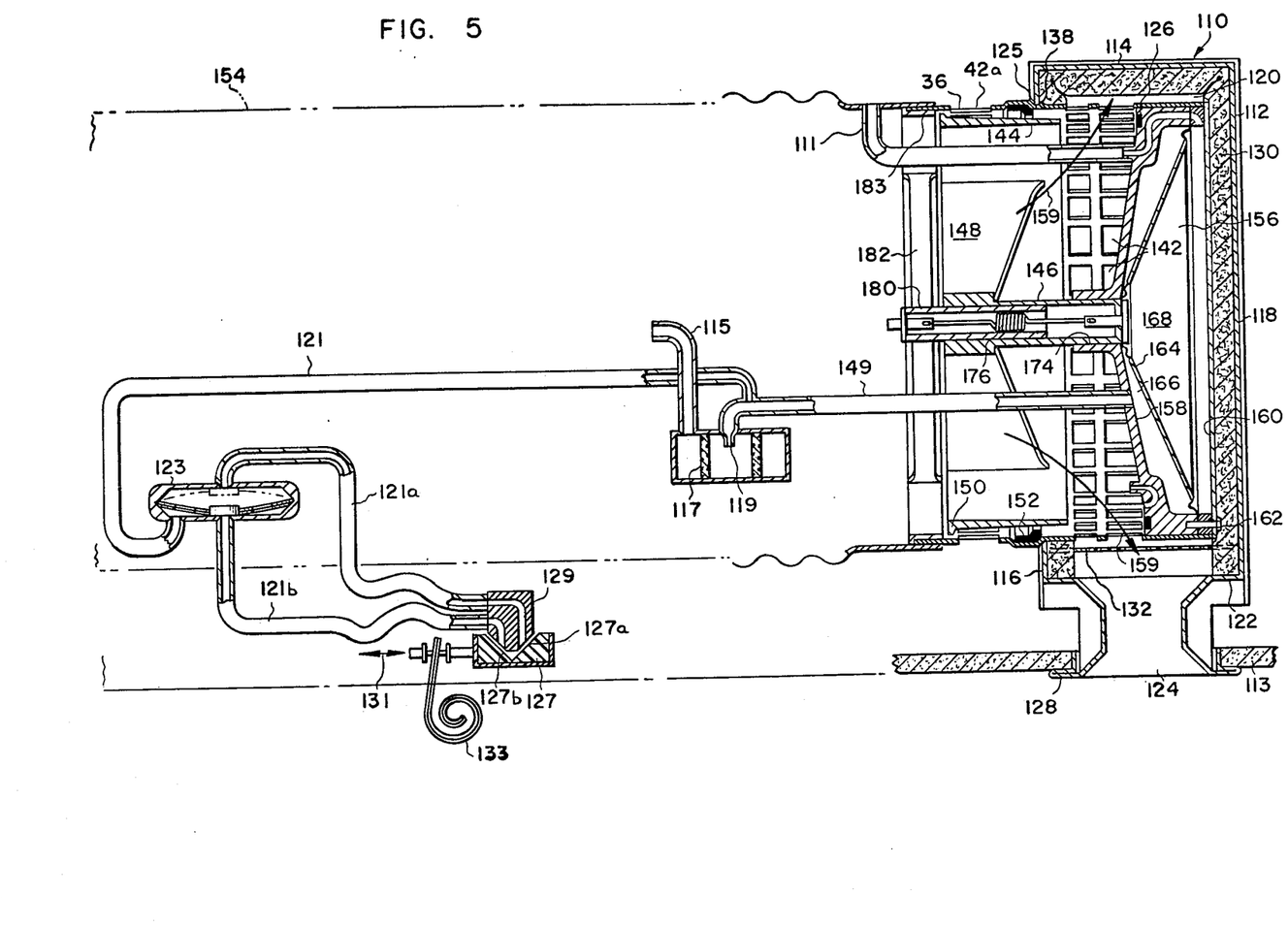
FIG. 5 is a partially sectioned partial schematic of a second embodiment of my invention particularly adapted to a constant volume low velocity air distribution system where temperature control is needed.

The embodiment shown in FIGS. 5 and 6 is intended for use in low pressure constant volume air distribution systems. Since the air delivered to the air distributor assembly is substantially constant, that portion which does not pass from the assembly into the room or conditioned space is bypassed usually via the space above a false ceiling to the air source. The operating pressures of such systems are customarily between about 0.2 and 1.0 inches of water (50 to 250 parcals).

The apparatus shown in FIGS. 5 and 6 is to a large extent the same or similar to that shown in FIGS. 1–4. To the extent that such apparatus is the same in structure and operation like reference numerals have been used. To simplify and shorten the disclosure, the bulk of the description will be directed to the differences.

Thus it will be noted that the outer portion of generally cylindrical sleeve 36 is provided with a row of circumferentially spaced second apertures 42a which are axially co-extensive with valve 144 when valve is in the position shown in FIG. 5 thereby closing apertures 42a. However, movement of valve 144 to the extreme right position closing aperture 142 will open apertures 42a thereby enabling the entire air flow from duct 154 to bypass outlet 124 via apertures 42a.

Since the system is one in which the volume of air delivered to the distributor assembly is essentially constant there is no need to provide a variable pressure compensator as in the embodiment of FIG. 1–14. However, the thermostatic control including changeover valve 123 may remain the same as in the first embodiment.

It should also be understood that where both cooling and heating temperature control is not desired the changeover valve and dual vent passageways may be eliminated and vent passageway 121 would be connected directly to the vent port head 129. Further, the vent port head can then be substantially simplified.

Figure 7:
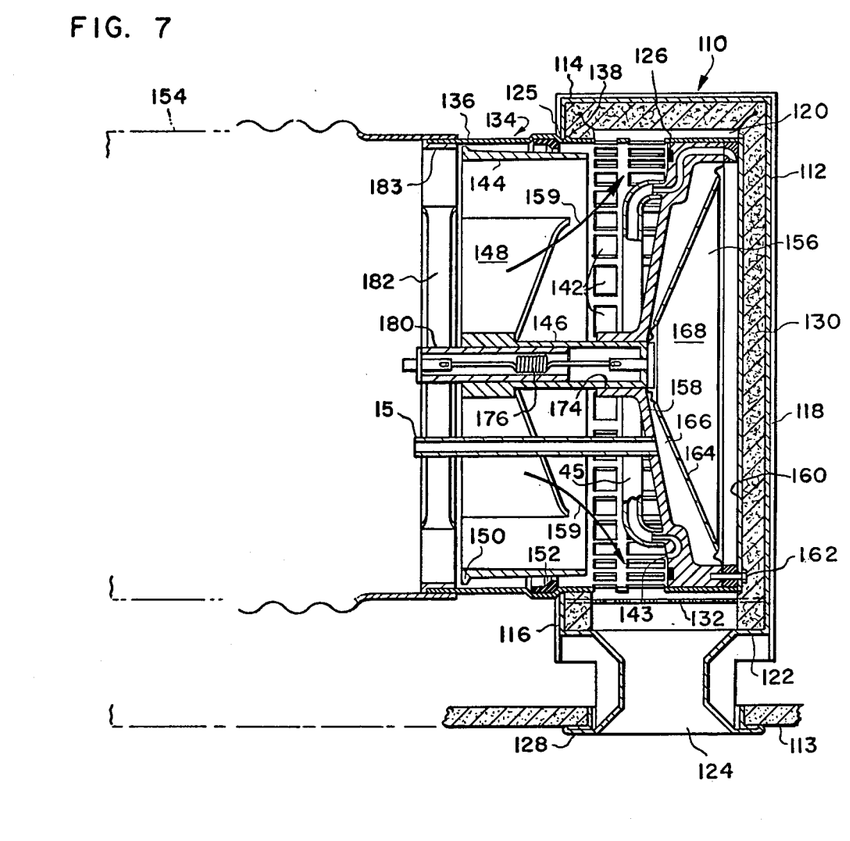
FIG. 7 is a partially sectioned partial schematic of a third embodiment of my invention particularly adapted to a variable pressure application wherein temperature control is not required.

The embodiment of FIG. 7 is a variation of that shown in FIG. 1. Again like elements are identified with like reference numerals. In this embodiment no temperature control is provided and diaphragm 164 functions solely in response to variations of pressure supplied to the air distributor assembly. In this sense diaphragm 164 achieves the result that was achieved by diaphragm 139 in the embodiment of FIG. 1–14. Thus total pressure of duct 154 is applied to the forward side of diaphragm 164 via pressure passageway 15 which has an opening, i.e., face, normal to the direction of air flow. To the other side of diaphragm 164 is applied a fluid pressure through a pressure passageway 45 having an opening 143, i.e. face, parallel to the direction of air flow immediately upstream of apertures 142. An increase in velocity at this point will product a reduction in static pressure applied to the rear side of diaphragm 164 thereby causing valve 144 to be moved by diaphragm 164 toward the right or closed position. Likewise a reduction in velocity at this point will have the reverse effect. The embodiment of FIG. 7 therefore simply provides air at substantially constant volume from a source of variable air pressure.

It will be observed that despite the variations in control that have been disclosed in the three embodiments, many of the elements of the apparatus are the same and may be interchanged thereby reducing the numbers of parts that need be stocked. Further, because the air flow control mechanism is made more closely associated with the supply duct and less closely associated as an integral part of the distributor plenum chamber, the nature and function of the distributor assembly may be altered by replacement of the air flow control mechanism at the air inlet of the plenum chamber.

Having thus described in detail several preferred embodiments of my invention, it is recognized that many variations may be made without departing from the scope or spirit of my invention and I accordingly desire to be limited only by the claims.

I claim:

1. Air distribution apparatus comprising: an air plenum chamber having air inlet opening for receiving air supplied under pressure and an air outlet communicating with a space; means for applying air to said inlet opening; valve means for controlling the air passing from said outlet opening; a fluid powered actuator means for positioning said valve means in response to a controlled fluid pressure; fluid control means for supplying a controlled fluid pressure to said actuator means including: a first element having first and second faces fixed in relation to each other at an oblique angle; a second element having first and second faces fixed in relation to each other at an oblique angle and disposed respectively in opposed relationships with said first and second faces of said element; a first vent passageway having a first port on said first face of one of said first and second elements; second vent passageway having a second port on said second face of one of said first and second elements; first means for adjusting the relative position of said first element through a first path that reduces or increases the spacing between said first faces of said first and second elements and simultaneously respectively increases or reduces the spacing between said faces of said first and second element in response to a first condition; second means for adjusting the relative position of said first and second elements through a second path non-parallel to said first path that reduces or increases the spacing between said first faces of said first and second elements and simultaneously respectively reduces or increases the spacing between said second faces of said first and second element in response to a second condition.

2. The apparatus as defined by claim 1 wherein said first condition is the temperature of said space.

3. The apparatus as defined by claim 1 wherein said second condition is the pressure of the air supplied to said inlet opening of said plenum chamber.

4. The apparatus as defined by claim 1 including means for selectively activating one of said first and second vent passageways in response to the temperature of the air supplied to said air distribution apparatus.

5. The apparatus as defined by claim 1 wherein said first condition is the temperature of said space and said second condition is the pressure of the air supplied to said inlet opening of said plenum chamber and further including means for selectively actuating one of said first and second vent passageways and deactivating the other of said first and second passageways in response to the temperature of the air supplied to said inlet opening of said plenum chamber.

6. Air distribution apparatus comprising: an air plenum chamber having an air inlet opening and an air outlet opening; a generally cylindrical sleeve extending axially inward of said inlet opening and having an inner portion disposed inwardly of said inlet opening and an outer portion; retainer means for retaining said sleeve in said inlet opening; an air conveying duct fastened to supply air to the end of said outer portion of said sleeve; means defining at least one first aperture at said inner portion of said sleeve extending radially outwardly communicating the interior of said sleeve with the interior of said plenum chamber; closure means at the end of said inner portion for blocking axial air flow; a generally cylindrically shaped valve disposed radially inwardly of said sleeve; mounting means for mounting said valve for axial movement within said sleeve between a first axial position at least partially outside of said inlet opening and substantially noncoextensive with said first apertures thereby opening said first apertures and a second axial position substantially coextensive with said first apertures thereby closing said first apertures; means for freely communicating the axial ends of said valve through said valve to thereby substantially balance the axial fluid forces exerted on said valve; a diaphragm disposed radially inwardly of said sleeve and axially adjacent said closure means and having an axially movable portion; means connecting said cylindrically shaped valve to said movable portion of said diaphragm whereby said valve may be moved axially by axial movement of said diaphragm; means for biasing said valve toward one of said first and second positions; means for applying a fluid pressure to one side of said diaphragm for movement of said valve toward the other of said first and second positions against said biasing means including a first pressure passageway having an end opening substantially normal to the flow through said air distribution apparatus and communicating with said one side of said diaphragm; means for applying a fluid pressure to the other side of said diaphragm including a second pressure passageway having an end opening substantially parallel to the direction of fluid flow adjacent but upstream of said first apertures; and vent means for venting said first pressure passageway intermediate said end opening and said one side of said diaphragm in response to temperature of a space served by said air distribution apparatus.

7. The apparatus as defined by claim 6 wherein said vent means further includes a vent passageway having a vent port operator having a vent port closure surface; means for varying the distance between said closure surface and said vent port in response to the temperature of the space served by said air distribution apparatus; a second diaphragm connected to adjust the relative space between said closure surface and said vent port; means for applying substantially total pressure of said duct to one side of said second diaphragm; means for applying a fluid pressure to the other side of said second diaphragm including a third pressure passageway having an end opening substantially parallel to the direction of fluid flow adjacent but upstream of said first apertures; and second biasing means for biasing said second diaphragm in a direction from said other side toward said one side of said second diaphragm.

8. The apparatus as defined by claim 6 wherein said vent means further includes first and second vent passageways; a changeover valve alternatively communicating said first and second vent passageways with said first pressure passageway; and actuator means responsive to the temperature of the air passing in said duct for actuating said changeover valve.

9. The apparatus as defined in claim 8 wherein each of said first and second vent passageways has a vent port at one end thereof; said vent ports facing in different directions; a vent port operator having a pair of vent port closure surfaces facing in different directions co-operatively positioned with respect to said vent ports; and means for simultaneously moving said vent port operator closure surfaces toward one vent port and away from the other vent port in response to an increase in temperature of said space and simultaneously away from said one vent port and toward the other vent port in response to a decrease in temperature of the space served by said air distribution apparatus.

10. The apparatus as defined by claim 9 wherein said vent port faces are at an oblique angle to each other; and wherein said last named means includes means for directly varying the distance between said vent port operator and one of said vent ports and simultaneously inversely varying the distance between said vent port operator and the other of said vent ports in response to the temperature of the space served by said air distribution apparatus.

11. The apparatus as defined by claim 10 wherein said vent means further includes a second diaphragm connected to directly adjust the relative space between said vent port operator and both of said vent ports; means for applying substantially total pressure of said duct to one side of said second diaphragm; means for applying a fluid pressure to the other side of said second diaphragm including a third pressure passageway having an end opening substantially parallel to the direction of fluid flow adjacent but upstream of said first apertures; and second biasing means for biasing said second diaphragm in a direction from said other side toward said one side of said second diaphragm.

12. The apparatus as defined by claim 6 wherein said outer portion of said sleeve extends axially outwardly of said outlet opening and has a plurality of circumferentially spaced second apertures extending radially therethrough directly communicating the interior of said sleeve with the space outside of said sleeve, duct and plenum chamber for bypassing air passing in said duct around said plenum chamber and the space served by said air distributor apparatus; said generally cylindrically shaped valve being positioned to close said apertures in said first position and to open said second apertures in said second position.

13. The apparatus as defined by claim 8 wherein said outer portion of said sleeve extends axially outwardly of said inlet opening and has a plurality of circumferentially spaced second apertures extending radially therethrough directly communicating the interior of said sleeve with the space outside of said sleeve, duct and plenum chamber for bypassing air passing in said duct around said plenum chamber and the space served by said air distributor apparatus; said generally cylindrically shaped valve being positioned to close said second apertures in said first position and to open said second apertures in said second position.

* * * * *

UNITED STATES PATENT OFFICE
CERTIFICATE OF CORRECTION

PATENT NO. : 3,961,748
DATED : June 8, 1976
INVENTOR(S) : John C. Mc Nabney

It is certified that error appears in the above-identified patent and that said Letters Patent are hereby corrected as shown below:

In Column 6, line 34 "said element" should read --said first element--.

In Column 6, line 43 "said faces" should read --said second faces--.

In Column 8, line 46 "said outlet" should read --said inlet--.

Signed and Sealed this

Seventeenth Day of August 1976

[SEAL]

Attest:

RUTH C. MASON
Attesting Officer

C. MARSHALL DANN
Commissioner of Patents and Trademarks